US012656198B2

(12) United States Patent
Cao et al.

(10) Patent No.: US 12,656,198 B2
(45) Date of Patent: Jun. 16, 2026

(54) CABLE TENSION CALCULATION METHOD SIMULTANEOUSLY CONSIDERING SAG, INCLINATION ANGLE AND BENDING STIFFNESS

(71) Applicants: Hohai University, Nanjing (CN); Jiangxi University of Science and Technology, Ganzhou (CN)

(72) Inventors: Maosen Cao, Nanjing (CN); Xin Zhang, Nanjing (CN); Tongfa Deng, Ganzhou (CN); Drahomir Novak, Nanjing (CN); Dragoslav Sumarac, Ganzhou (CN); Yufeng Zhang, Nanjing (CN); Shuai Li, Nanjing (CN); Xiangdong Qian, Nanjing (CN); Shuaitao Hu, Nanjing (CN); Kai Zhu, Nanjing (CN)

(73) Assignees: Hohai University, Nanjing (CN); Jiangxi University of Science and Technology, Ganzhou City (CN)

( * ) Notice: Subject to any disclaimer, the term of this patent is extended or adjusted under 35 U.S.C. 154(b) by 561 days.

(21) Appl. No.: 18/138,131

(22) Filed: Apr. 24, 2023

(65) Prior Publication Data

US 2023/0341280 A1      Oct. 26, 2023

(30) Foreign Application Priority Data

Apr. 24, 2022    (CN) ......................... 202210450349.X

(51) Int. Cl.
*G01L 5/04*       (2006.01)
*G06F 30/13*      (2020.01)
*G06F 113/16*     (2020.01)

(52) U.S. Cl.
CPC .............. *G01L 5/042* (2013.01); *G06F 30/13* (2020.01); *G06F 2113/16* (2020.01)

(58) Field of Classification Search
CPC ... G01L 5/00; G01L 5/04; G01L 5/042; G06F 30/13; G06F 2113/16
See application file for complete search history.

(56) References Cited

FOREIGN PATENT DOCUMENTS

| CN | 106323528 A | * | 1/2017 | ............. | G01L 5/042 |
| CN | 106500901 A | * | 3/2017 | ............... | G01L 5/06 |

OTHER PUBLICATIONS

Machine Translation of CN-106323528-A (Year: 2017).*
(Continued)

*Primary Examiner* — Nguyen Q. Ha
(74) *Attorney, Agent, or Firm* — Nitin Kaushik

(57)                ABSTRACT

A cable tension calculation method simultaneously considering the sag, inclination angle and bending stiffness includes: querying basic parameters of a stay cable according to design data and construction data; considering influences of the sag, the inclination angle θ and the bending stiffness EI, to calculate dimensionless parameters γ, ε and λ²; testing an acceleration response of the stay cable by an acceleration sensor, to identify a frequency ω of the acceleration response of the stay cable, further calculating a dimensionless frequency ω̂ of the stay cable and the dimensionless parameters γ, ε and λ², and substituting the dimensionless frequency ω̂ of the stay cable into a vibration characteristic equation, to establish a function relation between the dimensionless frequency ω̂ and a cable tension Ĥ* of the stay cable; and solving a root of the vibration characteristic equation, and identifying the cable tension H* of the stay cable according to the root.

9 Claims, 4 Drawing Sheets

(56)          References Cited

OTHER PUBLICATIONS

Machine Translation of CN-106500901-A (Year: 2017).*
Kin Zhang, et al., In-plane free vibrations of small-sag inclined
cables considering bending stiffness with applications to cable
tension identification, Journal of Sound and Vibration, 2023, pp.
1-29, vol. 544, 117394.

* cited by examiner

CABLE TENSION CALCULATION METHOD SIMULTANEOUSLY CONSIDERING SAG, INCLINATION ANGLE AND BENDING STIFFNESS

CROSS REFERENCE TO THE RELATED APPLICATIONS

This application is based upon and claims priority to Chinese Patent Application No. 202210450349. X, filed on Apr. 24, 2022, the entire contents of which are incorporated herein by reference.

TECHNICAL HELD

The present invention relates to the technical field of structure health monitoring and performance maintenance of bridges, and in particular to a cable tension calculation method simultaneously considering the sag, inclination angle and bending stiffness.

BACKGROUND

Cable-supported bridges have been widely used in modern river-crossing and sea-crossing engineering due to their stronger spanning capability than traditional bridge types. The length of many cable-supported bridges in the world have exceeded 1000 m. Most of cable-supported bridges serving as a backbone network of highway and railway transportation, connect important cities on both sides of rivers, and play an important role in river-crossing and sea-crossing traffic. Therefore, structural health monitoring of cable-supported bridges has the important economic values and social benefits.

The cable-supported bridge is a high-order statically indeterminate structure, consisting of several symmetrically distributed stay cables with different inclination angles. The stay cables connect the main beams and towers, can transfer the traffic loads as the most important bearing components of cable-supported bridges. The tension distribution of cables is very complex. In a long-term service process, cables inevitably suffer damage under the influence of loads, material deterioration and resistance attenuation. According to replacement cases of engineering cables, most of the stay cables will have common problems such as corrosion fatigue, damage of anchor devices. Besides, a few of stay cables will have extreme conditions such as steel wire fracture, seriously threatening the safety of bridges. Tension is the key parameter to reflect the operation conditions of cables. Therefore, it is of great significance to calculate cable tension and further evaluate the operation conditions of cable-supported bridges.

Currently, structural health monitoring systems have been applied to most of newly built and partially built cable-supported bridges. Acceleration sensors, as a part of the structural health monitoring system, are installed on cables to measure the dynamic response of cables. According to structural dynamics, there is a relationship between modal frequencies and tensions. So the collecting acceleration responses can be used to calculate cable tension, providing an index for evaluating operation states and maintenance of stay cables. However, most of existing studies have assumed that the vibration of stay cables is like a string in an ideal state. So the string vibration theory is utilized to calculate the cable tension based on the modal frequencies, which ignores the sag caused by gravity, inclination angle and material resistance such as bending stiffness. Therefore, there is always an error between the calculated and practical cable tension, seriously influencing to evaluate the stress distribution of stay cables.

SUMMARY

The present invention provides a cable tension calculation method simultaneously considering the sag, inclination angle and bending stiffness, which improves the accuracy of calculated tension by using modal frequencies.

The present invention provides a cable tension calculation method simultaneously considering the sag, inclination angle and bending stiffness. The main calculation steps includes:

Step 1, querying basic parameters of a stay cable according to design data or construction data;

Step 2, considering the influences of sag, inclination angle $\theta$ and bending stiffness EI, to calculate dimensionless parameters $\gamma$, $\varepsilon$ and $\lambda^2$ of stay cables, where the parameter $\gamma$ is a dimensionless parameter related to the bending stiffness EI, the parameter $\varepsilon$ is a dimensionless parameter related to the inclination angle $\theta$, and the parameter $\lambda^2$ is a dimensionless parameter related to the sag;

Step 3, collecting the acceleration response of stay cables by acceleration sensors, identifying the frequency $\omega$ of the acceleration response of the stay cable, and calculating the dimensionless frequency $\hat{\omega}$ of the stay cable, where the calculation equation of the dimensionless frequency being as follows;

$$\hat{\omega} = \omega l^2 \sqrt{m/EI}$$

m being the mass per unit length of the stay cable, and l being the cable length;

Step 4, substituting the dimensionless parameters $\gamma$, $\varepsilon$ and $\lambda^2$ and the dimensionless frequency $\hat{\omega}$ of the stay cable into a vibration characteristic equation to establish a function relation between the dimensionless frequency $\hat{\omega}$ and cable tension H* of the stay cable;

Step 5, using the dimensionless frequency of each order of the stay cable to calculate the cable tension H* since the stay cable has an infinite order natural frequency, solving a root of the frequency characteristic equation, and identifying the cable tension H* of the stay cable according to the root.

Further, the basic parameters of the stay cable in step 1 include: cable length l, mass per unit length m the inclination angle $\theta$ and the bending stiffness EI.

Further, calculate the dimensionless parameters $\gamma$, $\varepsilon$ and $\lambda^2$ of the stay cable as follows, $$\gamma = l\sqrt{H^*/EI}$$

$$\varepsilon = \xi \sin \theta$$

$$\lambda^2 = \delta \xi^2 \hat{L}_e$$

H*≈H/cos $\theta$ representing the cable tension of the stay cable, H representing the horizontal component of the cable tension. $\xi$=mgl/H* is a dimensionless parameter of a ratio of an inertia force to the cable tension, g is the acceleration of gravity, $\hat{L}_e$=1/(1+⅛$\xi^2$) representing a dimensionless parameter of a ratio of an original length of the stay cable considering the sag, and $\delta$=EA/H* representing a dimensionless parameter of a ratio of an axial tensile stiffness EA to the cable tension;

the dimensionless parameters $\gamma$, $\varepsilon$ and $\lambda^2$ are functions of the cable length l, the mass per unit length m, the cable tension H* the tensile stiffness EA, the inclination angle θ and the bending stiffness EI respectively, i.e., γ=γ(l,H*,EI), ε=ε(m,l,H*,θ) and λ=λ(EA,H*,m,l).

Further, a function relation between the dimensionless frequency $\hat{\omega}$ and the cable tension H* of the stay cable is established as follows:

$$P(\hat{\omega}, \lambda, \gamma, \varepsilon) = \frac{\dfrac{1}{2\lambda^2\gamma^4}(\lambda^2\gamma^2 - \hat{\omega}^2)}{\dfrac{\beta_2 \tan\left[\dfrac{\beta_1}{2}\right] - \beta_1 \tanh\left[\dfrac{\beta_2}{2}\right]}{\beta_1\beta_2(\beta_1^2 + \beta_2^2)} + \dfrac{\tanh\left[\dfrac{\gamma}{2}\right]}{\gamma^3} - \varepsilon^2 \dfrac{\Omega(\gamma, \hat{\omega})}{2\gamma^2}} - 1 = 0$$

$$\beta_1 = \sqrt{-\frac{\gamma^2}{2} + \sqrt{\frac{\gamma^4}{4} + \hat{\omega}^2}} \quad \text{and} \quad \beta_2 = \sqrt{\frac{\gamma^2}{2} + \sqrt{\frac{\gamma^4}{4} + \hat{\omega}^2}}$$

being characteristic roots of frequency equation for a horizontal stay cable, $\Omega(\gamma,\hat{\omega})$ being a high-order nonlinear term of controlling the cable tension, and being a function of the dimensionless parameter γ and the dimensionless frequency $\hat{\omega}$, and a specific calculation equation of $\Omega(\gamma,\hat{\omega})$ being as follows:

$$\Omega(\gamma, \hat{\omega}) = \left\{ \frac{1}{3} + \frac{2\gamma^2\left(-2 + \beta_1\cot\left[\frac{\beta_1}{2}\right]\right)}{\beta_1^2(\beta_1^2 + \beta_2^2)} + \frac{2\gamma^2\left(-2 + \beta_2\coth\left[\frac{\beta_2}{2}\right]\right)}{\beta_2^2(\beta_1^2 + \beta_2^2)} - \right.$$

$$\frac{3\left(-2 + \gamma\cot\left[\frac{\gamma}{2}\right]\right)}{\gamma^2} + \frac{4\gamma\left(\gamma - 2\tanh\left[\frac{\gamma}{2}\right]\right)}{\hat{\omega}^2} + \frac{\left(-4\gamma + (8 + \gamma^2)\tanh\left[\frac{\gamma}{2}\right]\right)}{\gamma^3} +$$

$$\frac{4\beta_2^2\gamma^3\left(-2 + \beta_1\cot\left[\frac{\beta_1}{2}\right]\right)\tanh\left[\frac{\gamma}{2}\right] - 4\gamma^5\left(-2 + \beta_1\cot\left[\frac{\beta_1}{2}\right]\right)\tanh\left[\frac{\gamma}{2}\right]}{\beta_1^2(\beta_1^2 + \beta_2^2)\hat{\omega}^2} -$$

$$\frac{4\gamma\left(-2 + \beta_1\cot\left[\frac{\beta_1}{2}\right]\right)\tanh\left[\frac{\gamma}{2}\right]}{\beta_1^2(\beta_1^2 + \beta_2^2)} - \frac{4\beta_1^2\gamma^3\left(-2 + \beta_2\coth\left[\frac{\beta_2}{2}\right]\right)\tanh\left[\frac{\gamma}{2}\right]}{\beta_2^2(\beta_1^2 + \beta_2^2)\hat{\omega}^2} -$$

$$\left. \frac{4\gamma^5\left(-2 + \beta_2\coth\left[\frac{\beta_2}{2}\right]\right)\tanh\left[\frac{\gamma}{2}\right]}{\beta_2^2(\beta_1^2 + \beta_2^2)\hat{\omega}^2} - \frac{4\gamma\left(-2 + \beta_2\coth\left[\frac{\beta_2}{2}\right]\right)\tanh\left[\frac{\gamma}{2}\right]}{\beta_2^2(\beta_1^2 + \beta_2^2)} \right\},$$

and therefore a frequency characteristic equation establishes the function relation between the cable tension H* and the dimensionless frequency $\hat{\omega}$, i.e., $$P=P(\hat{\omega},H^*,EA,m,l,EI,\theta).$$

Further, a root of P=P($\hat{\omega}$, H*, EA, m, l, EI, θ) is solved by means of a trust region dogleg method, to identify the dimensionless frequency $\hat{\omega}$, such that the cable tension H* of the stay cable is solved.

Further, for a specific stay cable, the tensile stiffness EA, the mass per unit length m, the cable length l, the bending stiffness EI and the inclination angle θ in the frequency characteristic equation in step 4 are all constants, and therefore the cable tension H* of the stay cable is uniquely determined by the dimensionless frequency $\hat{\omega}$.

Further, the testing an acceleration response of the stay cable by means of an acceleration sensor in step 3 specifically includes: arranging a vibration string type acceleration response sensor near a middle span of the stay cable, to test the acceleration response of the stay cable under excitation of an environment, and converting an acceleration signal into an electric signal to be transmitted. The electrical signal is transmitted to an external workstation through a data acquisition instrument and stored in a database.

Further, the vibration string type acceleration response sensor uses a DH610J type voltage output type acceleration sensor.

Further, the dimensionless frequency of each order of the stay cable in step 5 is identified by Fourier transform.

Compared with the prior art, the present invention has the beneficial effects:

the present invention provides the cable tension calculation method simultaneously considering the sag, inclination angle and bending stiffness, which solves the problems of an error and insufficient accuracy in cable tension calculation of the stay cable. Compared with existing methods, the method breaks through limitations that the sag, inclination angle and bending stiffness are not simultaneously considered to calculate a cable tension of a stay cable in the prior art, which not only improves accuracy of calculating the cable tension by using the fundamental frequency, but also improves accuracy of calculated cable tension by using high-order frequencies, thereby creating conditions for identification of the actual cable tension of stay cables in bridge engineering.

Different from the cable tension calculation method based on string theory, the identification result of cable tension has higher accuracy due to the present invention considers the comprehensive influence of sag, inclination angle and bending stiffness; The calculated error may be controlled in 5.0%. Meanwhile, different from the cable tension calculation method based on the sag method, the present invention may obtain a more accurate result since the present invention additionally considers influences of the inclination angle and the bending stiffness; different from the cable tension calculation method considering bending stiffness, the calculation result has higher accuracy since the present invention additionally considers influences of sag and inclination angle; and the calculation method of the present invention improves the accuracy of calculating the cable tension of the stay cable by using the high-order frequency.

DETAILED DESCRIPTION OF THE EMBODIMENTS

A particular embodiment of the present invention is described in detail below in combination with FIGS. 1-4, but it should be understood that the scope of protection of the present invention is not limited by the particular embodiment.

Figure 1:
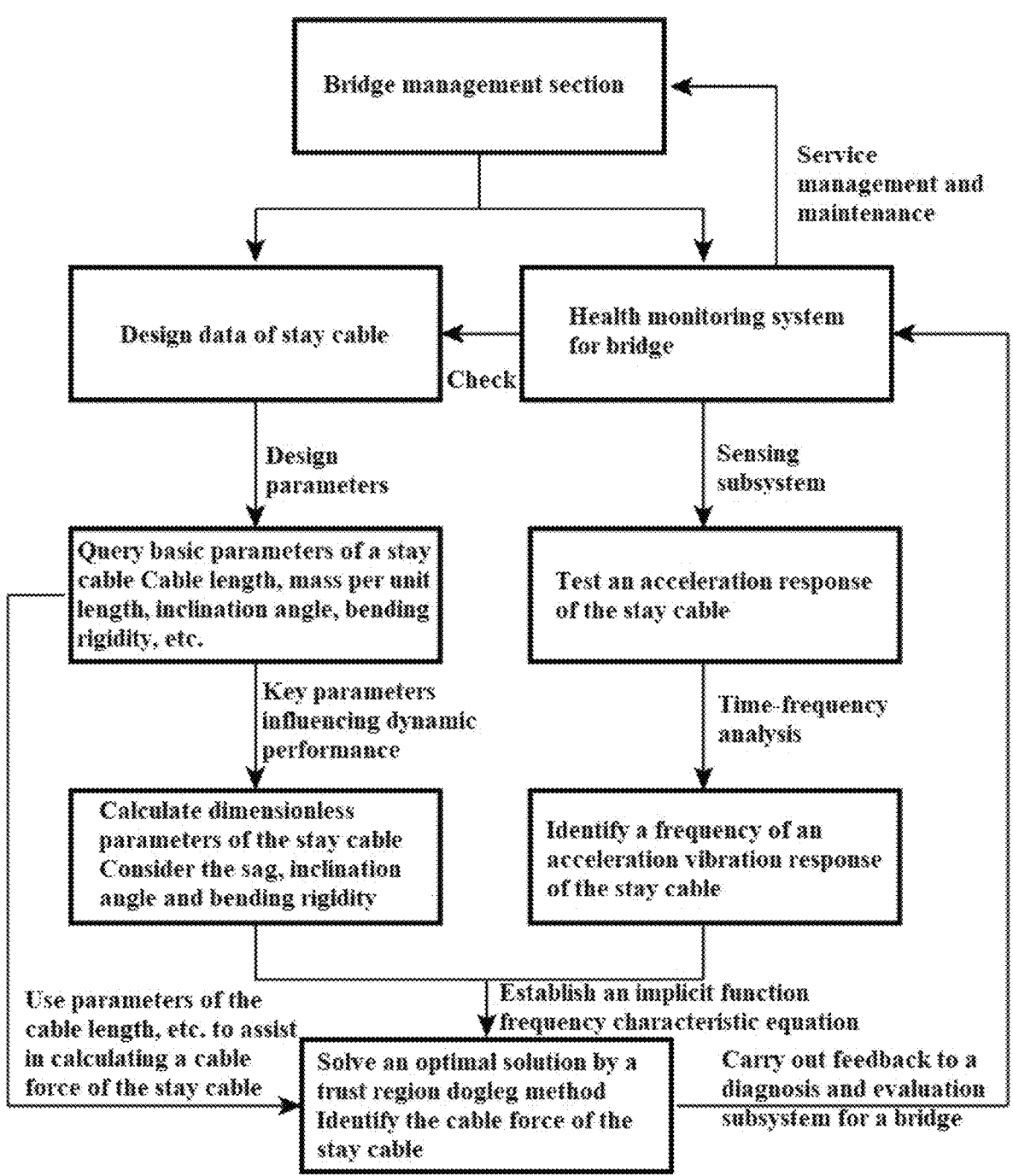
FIG. 1 is a schematic diagram of implementation steps of proposed cable tension calculation method simultaneously considering the sag, inclination angle and bending stiffness provided in the present invention.

In a long-term service process, under a coupling action of internal and external factors, performance deterioration and resistance attenuation of the stay cables are inevitably generated. According to display of replacement cases, most of the stay cables will have common problems such as corrosion fatigue and damage of anchor devices, seriously threatening safety of bridges. As shown in FIG. 1, the present invention provides a cable tension calculation method synchronously considering the sag, inclination angle and bending stiffness. The method can calculate the cable tension of stay cables with high accuracy, and feed back to the bridge management department by means of a diagnosis and evaluation subsystem, thereby effectively serving maintenance and management work of bridges.

One end of the stay cable is fixed to a bearing plate in an anchorage area of a girder of the bridge, and one end of the stay cable is fixed in an anchor box of a tower. There is a certain inclination angle between the two ends. Generally, a long stay cable has an inclination angle between 20° and 40°, and a short stay cable may have a larger inclination angle. Moreover, under the action of gravity, an equilibrium position of stay cables is no longer like a straight line in an ideal state, but there is a certain sag, and a configuration of the stay cable in a static state is a catenary. Vibration of the stay cable is a small oscillation near the vibration equilibrium position. The bending stiffness of the stay cable has some influence on a motion state, especially in a boundary area of an anchorage end. Therefore, it is necessary to synchronously consider influences of the sag, inclination angle and bending stiffness to normally calculate the cable tension of stay cables.

Figure 2:
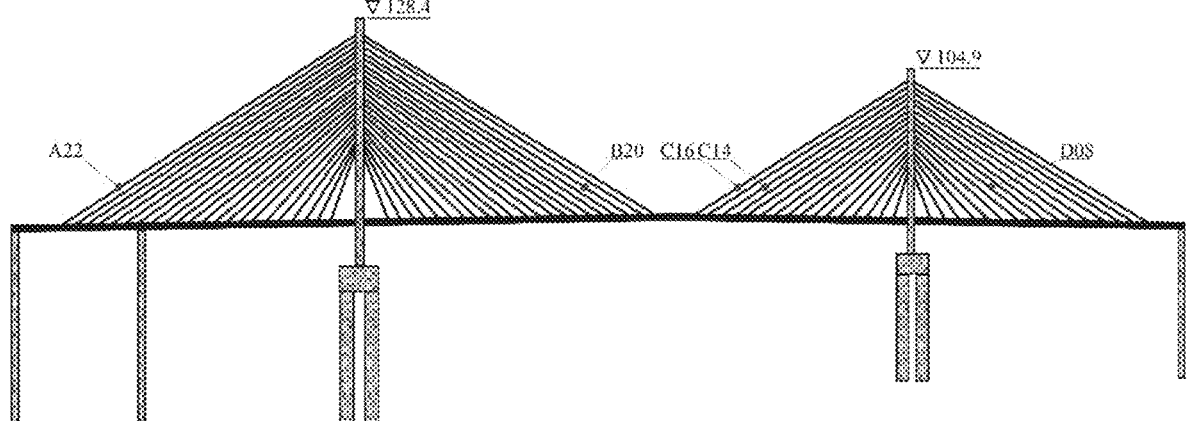
FIG. 2 is a layout diagram of an acceleration sensor for a stay cable provided in an example of the present invention.

In view of the above problem, the present invention provides a cable tension calculation method synchronously considering the sag, inclination angle and bending stiffness. The present invention is further described in detail below in combination with accompanying drawings and examples. It should be understood that the specific example described herein is merely illustrative of the present invention and is not intended to limit the present invention. A specific implementation process includes:

Step 1. query basic parameters of a stay cable according to design data or construction data, such as the cable length l, the mass per unit length m, the inclination angle θ and the bending stiffness EI. As shown in FIG. 2, the present invention selects 5 stay cables of a cable-supported bridge, Poyanghu Bridge. The basic parameters of the stay cables are as follows:

TABLE 1

Basic parameters of stay cables of bridge

| Serial number | Length (m) | bending stiffness (N · m²) | mass per unit length (kg/m) | Inclination angle (°) | As-built cable tension (kN) |
|---|---|---|---|---|---|
| A22 | 201.117 | $1.84 \times 10^6$ | 85.5 | 26.51 | 5630 |
| B20 | 184.251 | $1.84 \times 10^6$ | 85.5 | 27.31 | 5290 |
| C14 | 131.148 | $1.84 \times 10^6$ | 85.5 | 28.29 | 5120 |
| C16 | 146.701 | $1.84 \times 10^6$ | 85.5 | 26.23 | 4190 |
| D08 | 86.711 | $9.10 \times 10^5$ | 60.1 | 39.06 | 3510 |

Step 2, consider influences of sag, inclination angle and bending stiffness, to calculate three dimensionless parameters γ, ε and $\lambda^2$ influenced by the stay cable, the parameter γ being a dimensionless parameter related to the bending stiffness, the parameter ε being a dimensionless parameter related to the inclination angle, and the parameter $\lambda^2$ being a dimensionless parameter related to the sag. Calculation methods of the three dimensionless parameters are as follows:

$$\gamma = l\sqrt{H^*/EI}$$

$$\varepsilon = \xi \sin \theta$$

$$\lambda^2 = \delta \xi^2 \hat{L}_e$$

In the example, the dimensionless parameters are functions of the cable length l, the cable tension H*, the tensile rigidity EA, the inclination angle θ and the bending stiffness EI respectively, i.e., γ=γ(l,H*,EI), ε=ε(m,l,H*,θ) and λ=λ (EA,H*,m,l). A specific calculation result is as shown in Table 2:

TABLE 2

Dimensionless parameter calculation result

| Serial number | Dimensionless parameter γ | Dimensionless parameter ε | Dimensionless parameter $\lambda^2$ |
|---|---|---|---|
| A22 | 354.18 | 0.0132 | 0.3244 |
| B20 | 314.53 | 0.0132 | 0.3282 |
| C14 | 219.88 | 0.0101 | 0.1852 |
| C16 | 222.83 | 0.0128 | 0.4193 |
| D08 | 171.08 | 0.0091 | 0.0876 |

Step 3, test the acceleration response of the stay cable by means of an acceleration sensor. The frequency ω can be identified by the acceleration response, and further calculate a dimensionless frequency $\hat{\omega}$ of the stay cable as follows:

$$\hat{\omega} = \omega l^2 \sqrt{m/EI}$$

Figure 3:
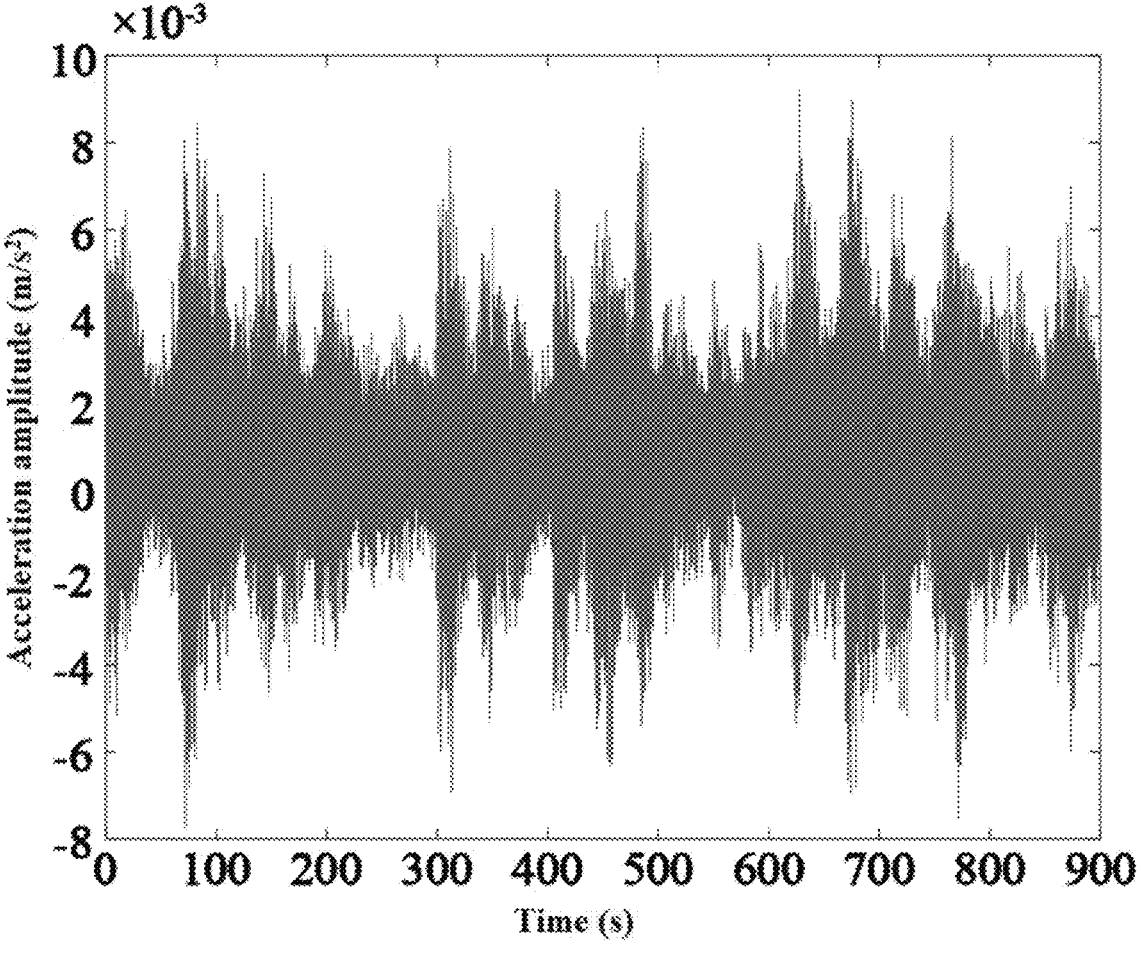
FIG. 3 is a schematic diagram of an actual measurement of an acceleration response of a stay cable provided in an example of the present invention.
Figure 4:
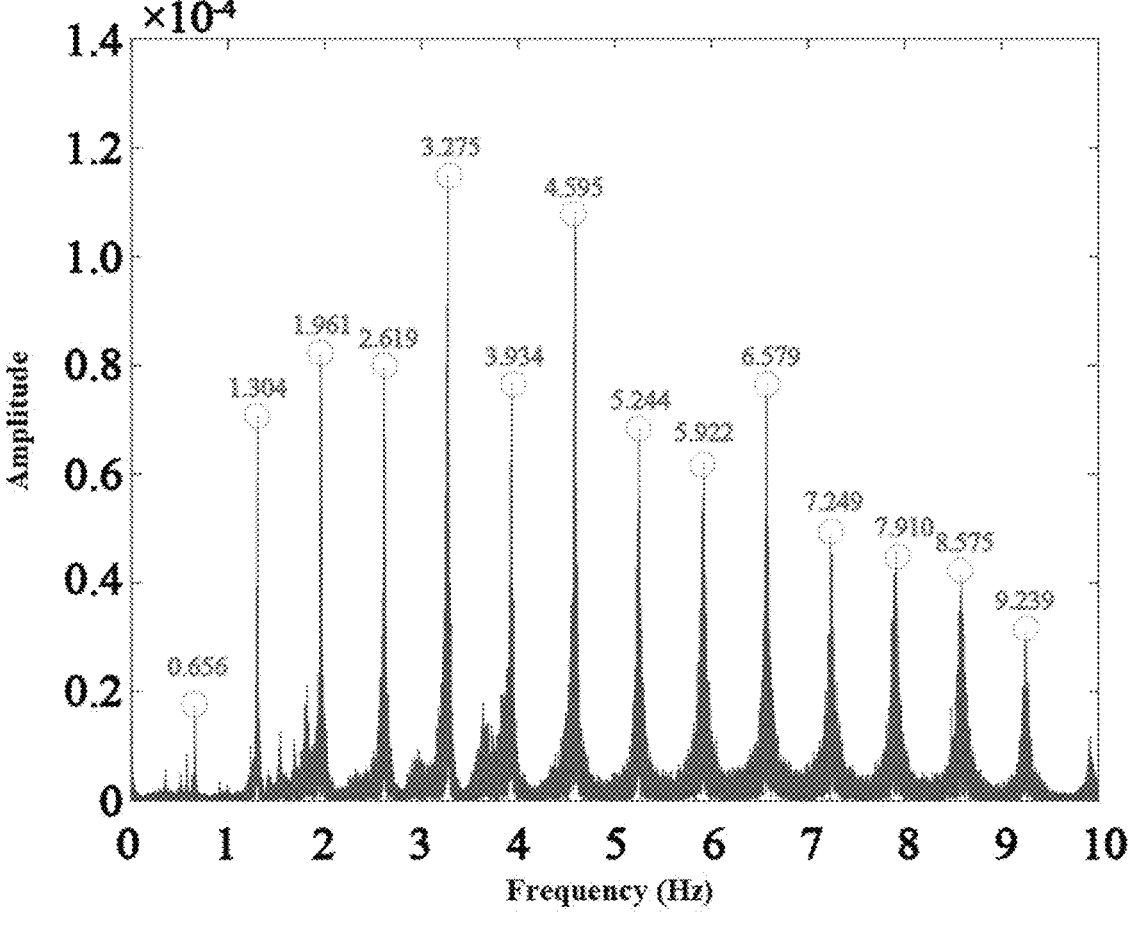
FIG. 4 is a schematic diagram of a frequency identification result of an acceleration response of a stay cable provided in an example of the present invention.

A specific implementation process for this example is as follows: an acceleration response sensor is arranged near the middle span of the stay cable, and the acceleration response of the stay cable is tested under excitation of an environment, an acceleration signal is converted into an electrical signal to be transmitted, the electric signal is transmitted to an external working station by a network cable through a data acquisition instrument, and the external working station summarizes data and then transmits a data file back to a database for storage. The specifications of the acceleration sensor is a DH610J voltage output type acceleration sensor. This sensor is suitable for occasions having low frequency and low-amplitude vibration measurement. A typical measurement result is shown in FIG. 3. In the example, the stay cable A22 is used as an example, Fourier transform is used for identifying the frequency of the stay cable. The frequency identification result of each order is shown in FIG. 4, Step 4, substitute the above parameters into a vibration characteristic equation of the stay cable to establish a function relation between the dimensionless frequency $\hat{\omega}$ and a cable tension H* of the stay cable:

$$P(\hat{\omega}, \lambda, \gamma, \varepsilon) = \frac{\frac{1}{2\lambda^2\gamma^4}(\lambda^2\gamma^2 - \hat{\omega}^2)}{\frac{\beta_2\tan\left[\frac{\beta_1}{2}\right] - \beta_1\tanh\left[\frac{\beta_2}{2}\right]}{\beta_1\beta_2(\beta_1^2 + \beta_2^2)} + \frac{\tanh\left[\frac{\gamma}{2}\right]}{\gamma^3} - \varepsilon^2\frac{\Omega(\gamma, \hat{\omega})}{2\gamma^2}} - 1 = 0$$

$$\beta_1 = \sqrt{-\frac{\gamma^2}{2} + \sqrt{\frac{\gamma^4}{4} + \hat{\omega}^2}}, \text{ and } \beta_2 = \sqrt{\frac{\gamma^2}{2} + \sqrt{\frac{\gamma^4}{4} + \hat{\omega}^2}}.$$

$\Omega(\gamma,\hat{\omega})$ is a high-order nonlinear term, which is a function of the dimensionless parameters $\gamma$, the dimensionless frequency $\hat{\omega}$. A specific calculation equation of $\Omega(\gamma,\hat{\omega})$ is as follows:

$$\Omega(\gamma, \hat{\omega}) = \left\{ \frac{1}{3} + \frac{2\gamma^2\left(-2 + \beta_1 \cot\left[\frac{\beta_1}{2}\right]\right)}{\beta_1^2(\beta_1^2 + \beta_2^2)} + \frac{2\gamma^2\left(-2 + \beta_2 \coth\left[\frac{\beta_2}{2}\right]\right)}{\beta_2^2(\beta_1^2 + \beta_2^2)} - \right.$$

$$\frac{3\left(-2 + \gamma\cot\left[\frac{\gamma}{2}\right]\right)}{\gamma^2} + \frac{4\gamma\left(\gamma - 2\tanh\left[\frac{\gamma}{2}\right]\right)}{\hat{\omega}^2} + \frac{\left(-4\gamma + (8 + \gamma^2)\tanh\left[\frac{\gamma}{2}\right]\right)}{\gamma^3} +$$

$$\frac{4\beta_2^2\gamma^3\left(-2 + \beta_1\cot\left[\frac{\beta_1}{2}\right]\right)\tanh\left[\frac{\gamma}{2}\right] - 4\gamma^5\left(-2 + \beta_1\cot\left[\frac{\beta_1}{2}\right]\right)\tanh\left[\frac{\gamma}{2}\right]}{\beta_1^2(\beta_1^2 + \beta_2^2)\hat{\omega}^2} -$$

$$\frac{4\gamma\left(-2 + \beta_1\cot\left[\frac{\beta_1}{2}\right]\right)\tanh\left[\frac{\gamma}{2}\right]}{\beta_1^2(\beta_1^2 + \beta_2^2)} - \frac{4\beta_1^2\gamma^3\left(-2 + \beta_2\coth\left[\frac{\beta_2}{2}\right]\right)\tanh\left[\frac{\gamma}{2}\right]}{\beta_2^2(\beta_1^2 + \beta_2^2)\hat{\omega}^2} -$$

$$\left. \frac{4\gamma^5\left(-2 + \beta_2\coth\left[\frac{\beta_2}{2}\right]\right)\tanh\left[\frac{\gamma}{2}\right]}{\beta_2^2(\beta_1^2 + \beta_2^2)\hat{\omega}^2} - \frac{4\gamma\left(-2 + \beta_2\coth\left[\frac{\beta_2}{2}\right]\right)\tanh\left[\frac{\gamma}{2}\right]}{\beta_2^2(\beta_1^2 + \beta_2^2)} \right\}$$

therefore a frequency characteristic equation establishes the function relation between the cable tension H* and the dimensionless frequency $\hat{\omega}$ of the stay cable, i.e., $$P = P(\hat{\omega}, H^*, EA, m, l, EI, \theta)$$

Step 5, solve the root of the vibration characteristic equation, and identify the cable tension of the stay cable according to the root: For a specific stay cable, the tensile rigidity EA, the mass m per unit length, the cable length l, the bending stiffness EI and the inclination angle θ in the frequency characteristic equation in step 4 are all constants, and therefore the cable tension H* of the stay cable is uniquely determined by the dimensionless frequency $\hat{\omega}$. a trust region dogleg method is used for identifying a root of P=0 in the present invention. Since the stay cable has an infinite-order natural vibration frequency, the dimensionless frequency of each order of the stay cable may be used for calculating the cable tension. In practice, a first-order frequency is generally selected to calculate the cable tension. The first-order frequency of each stay cable test and a result of calculating the cable tension of the stay cable are shown in Table 3. The calculated error are shown in the corresponding brackets:

TABLE 3

| Cable tension identification result of the present invention and string vibration theory identification result (errors in brackets, %) | | | |
| --- | --- | --- | --- |
| Serial number | Tested first-order frequency (Hz) | Cable tension calculation result and error of the method of the present invention (kN) | String vibration theory cable tension calculation result and error (kN) |
| A22 | 0.656 | 5728 (1.74) | 5953 (5.73) |
| B20 | 0.701 | 5498 (3.93) | 5705 (7.84) |

TABLE 3-continued

| Cable tension identification result of the present invention and string vibration theory identification result (errors in brackets, %) | | | |
| --- | --- | --- | --- |
| Serial number | Tested first-order frequency (Hz) | Cable tension calculation result and error of the method of the present invention (kN) | String vibration theory cable tension calculation result and error (kN) |
| C14 | 0.963 | 5328 (4.06) | 5459 (6.62) |
| C16 | 0.779 | 4269 (1.88) | 4465 (6.56) |
| D08 | 1.403 | 3499 (0.31) | 3558 (1.37) |

The result shows that the method of the present invention has higher identification accuracy, a maximum error is 4.06%, may be controlled within 5%, and satisfies engineering requirements compared with the string theory method. The calculated error of the string theory is generally greater than 5% of error. The maximum error is 7.84%. The calculation result influences the bridge management department to correctly evaluate the working state of the stay cable.

Another feature of the present invention is that for the same stay cable, the accuracy of calculating the cable tension by the high-order frequency has been greatly improved. As shown in Table 4, the result of calculating the cable tension by each order frequency of the No. A22 cable have higher accuracy than that of a traditional string theory. The calculated error is less than 5%. An error of calculating the cable tension by the string vibration theory is generally 5% or above, and the higher the frequency order is, the greater the error is.

TABLE 4

| Calculation result of cable tension at each order frequency of stay cable No. A22 (error in brackets, %) | | | |
| --- | --- | --- | --- |
| Frequency order | Tested each order frequency (Hz) | Cable tension calculation result and error of the method of the present invention (kN) | String vibration theory cable tension calculation result and error (kN) |
| 1 | 0.656 | 5728 (1.74) | 5953 (5.73) |
| 2 | 1.304 | 5787 (2.79) | 5863 (4.14) |
| 3 | 1.961 | 5834 (3.63) | 5917 (5.10) |
| 4 | 2.619 | 5859 (4.07) | 5944 (5.58) |
| 5 | 3.275 | 5824 (3.45) | 5913 (5.03) |
| 6 | 3.934 | 5862 (4.12) | 5956 (5.79) |
| 7 | 4.595 | 5843 (3.78) | 5943 (5.56) |
| 8 | 5.244 | 5874 (4.33) | 5980 (6.22) |
| 9 | 5.922 | 5855 (4.00) | 5969 (6.02) |
| 10 | 6.279 | 5867 (4.21) | 5989 (6.38) |
| 11 | 7.249 | 5867 (4.21) | 5999 (6.55) |
| 12 | 7.910 | 5866 (4.19) | 6008 (6.71) |
| 13 | 8.575 | 5860 (4.09) | 6013 (6.80) |
| 14 | 9.239 | 5884 (4.51) | 6049 (7.44) |
| Average | | 5846.20 (3.84) | 5970.53 (6.05) |

The present invention discloses the cable tension calculation method simultaneously considering triple effects of the sag, inclination angle and bending stiffness, The method specifically includes: query the basic parameters of the stay cable according to the design data or the construction data; consider the influences of the sag, inclination angle and bending stiffness, to calculate the three dimensionless parameters influenced by the stay cable; test the acceleration response of the stay cable by acceleration sensors, to identify the frequency of the acceleration response of the stay cable, and further calculate the dimensionless frequency of the stay cable; substitute the above parameters into the vibration characteristic equation of the stay cable, to establish the function relation between the dimensionless frequency and the cable tension of the stay cable; and solve the root of the vibration characteristic equation, and identify the cable tension of the stay cable according to the root. Compared with a traditional cable tension calculation method, the method has higher calculation accuracy since the present invention simultaneously considers the influences of the sag, the inclination angle and the bending stiffness, and an error may be controlled within 5%, and satisfies actual engineering requirements, thereby providing a reliable method for accurate calculation of the cable tension of the stay cable. The calculation result may provide a reference basis for a bridge management department to manage and maintain the stay cable.

The present invention provides the cable tension calculation method simultaneously considering the sag, inclination angle and bending stiffness, which solves the problem of an error and insufficient accuracy in cable tension calculation of the stay cable. Compared with an existing method, the method breaks through limitations to calculate the cable tension in the prior art, which not only improves accuracy of calculating the cable tension by using a fundamental frequency, but also improves accuracy of calculating the cable tension by using the high-order frequencies, thereby creating conditions for identification of an actual cable tension of the stay cable in bridge engineering.

The embodiment of the present invention is described in detail above in combination with the accompanying drawings, but the present invention is not limited to the above embodiment, various changes can further be made within the scope of knowledge possessed by those of ordinary skill in the art without departing from the spirit of the present invention, and any changes that can be conceived by those skilled in the art shall fall within the scope of protection of the present invention.

What is claimed is:

1. A cable tension calculation method simultaneously considering the sag, inclination angle and bending stiffness, comprising:

Step 1, querying basic parameters of a stay cable from the structural health monitoring systems of bridges according to design data or construction data;

Step 2, calculating dimensionless parameters $\gamma$, $\varepsilon$ and $\lambda^2$ of the stay cable according to the sag, inclination angle $\theta$ and bending stiffness EI of the stay cable through a computing module in structural health monitoring systems, the parameter $\gamma$ being a dimensionless parameter related to the bending stiffness EI, the parameter being a dimensionless parameter related to the inclination angle $\theta$, and the parameter $\lambda^2$ being a dimensionless parameter related to the sag;

Step 3, testing an acceleration response of the stay cable by an acceleration sensor, to identify a frequency $\omega$ of the acceleration response of the stay cable, and further calculating a dimensionless frequency $\hat{\omega}$ of the stay cable, a calculation equation of the dimensionless frequency being as follows:

$$\hat{\omega} = \omega l^2 \sqrt{m/EI}$$

m being mass per unit length of the stay cable, and l being a length of the stay cable;

Step 4, substituting the dimensionless parameters $\gamma$, $\varepsilon$ and $\lambda^2$ and the dimensionless frequency $\hat{\omega}$ of the stay cable into a vibration characteristic equation of the stay cable to establish a function relation between the dimensionless frequency $\hat{\omega}$ and a cable tension H* of the stay cable; and Step 5, using the dimensionless frequency of each order to calculate the cable tension H*, solving a root of the vibration characteristic equation based on the trust region dogleg algorithm in the computing module of the structural health monitoring, and identifying the cable tension H* according to the root.

2. The cable tension calculation method simultaneously considering the sag, inclination angle and bending stiffness of claim 1, wherein the basic parameters of the stay cable in step 1 are called from the structural health monitoring systems, including the cable length l, the mass per unit length m, the inclination angle $\theta$ and the bending stiffness EI.

3. The cable tension calculation method simultaneously considering the sag, inclination angle and bending stiffness of claim 2, wherein calculation equations of calculating the dimensionless parameters $\gamma$, $\varepsilon$ and $\lambda^2$ influenced by the stay cable are as follows:

$$\gamma = l\sqrt{H^*/EI}$$

$$\varepsilon = \xi \sin \theta$$

$$\lambda^2 = \delta \xi^2 \hat{L}_e$$

H*≈H/cos $\theta$ representing the cable tension of the stay cable, H representing a horizontal component of the cable tension of the stay cable, $\xi$=mgl/H* representing a dimensionless parameter of a ratio of an inertia force to the cable tension of the stay cable, g representing an acceleration of gravity, $\hat{L}_e$=1/(1+1/8$\xi^2$) representing a dimensionless parameter of a ratio of an original length to length after deformation, and $\delta$=EA/H* representing a dimensionless parameter of a ratio of an axial tensile rigidity EA to the cable tension, wherein the dimensionless parameters $\gamma$, $\varepsilon$ and $\lambda^2$ are functions of the cable length l, the mass m per unit length, the cable tension H* of the stay cable, the tensile rigidity EA, the inclination angle $\theta$ and the bending stiffness EI respectively, i.e., $\gamma = \gamma(l,H^*,EI)$, $\varepsilon = \varepsilon(m,l,H^*,\theta)$ and $\lambda = \lambda(EA,H^*,m,l)$, and wherein all these parameters are calculated and stored in the calculating module of the systems.

4. The cable tension calculation method simultaneously considering the sag, inclination angle and bending stiffness of claim 3, wherein a function relation between the dimensionless frequency $\hat{\omega}$ and the cable tension H* of the stay cable is established as follows:

$$P(\hat{\omega}, \lambda, \gamma, \varepsilon) = \frac{\frac{1}{2\lambda^2\gamma^4}(\lambda^2\gamma^2 - \hat{\omega}^2)}{\frac{\beta_2\tan\left[\frac{\beta_1}{2}\right] - \beta_1\tanh\left[\frac{\beta_2}{2}\right]}{\beta_1\beta_2(\beta_1^2 + \beta_2^2)} + \frac{\tanh\left[\frac{\gamma}{2}\right]}{\gamma^3} - \varepsilon^2\frac{\Omega(\gamma, \hat{\omega})}{2\gamma^2}} - 1 = 0,$$

$$\beta_1 = \sqrt{-\frac{\gamma^2}{2} + \sqrt{\frac{\gamma^4}{4} + \hat{\omega}^2}} \text{ and } \beta_2 = \sqrt{\frac{\gamma^2}{2} + \sqrt{\frac{\gamma^4}{4} + \hat{\omega}^2}}$$

being characteristic roots of a horizontal stay cable frequency equation, $\Omega(\gamma,\hat{\omega})$ being a high-order nonlinear term, and being a function of the dimensionless parameter $\gamma$ and the dimensionless frequency $\hat{\omega}$, and a specific calculation equation of $\Omega(\gamma,\hat{\omega})$ being as follows:

$$\Omega(\gamma, \hat{\omega}) = \left\{ \frac{1}{3} + \frac{2\gamma^2\left(-2 + \beta_1\cot\left[\frac{\beta_1}{2}\right]\right)}{\beta_1^2(\beta_1^2 + \beta_2^2)} + \frac{2\gamma^2\left(-2 + \beta_2\coth\left[\frac{\beta_2}{2}\right]\right)}{\beta_2^2(\beta_1^2 + \beta_2^2)} - \right.$$

$$\frac{3\left(-2 + \gamma\cot\left[\frac{\gamma}{2}\right]\right)}{\gamma^2} + \frac{4\gamma\left[\gamma - 2\tanh\left[\frac{\gamma}{2}\right]\right]}{\hat{\omega}^2} + \frac{\left(-4\gamma + (8 + \gamma^2)\tanh\left[\frac{\gamma}{2}\right]\right)}{\gamma^3} +$$

$$\frac{4\beta_2^2\gamma^3\left(-2 + \beta_1\cot\left[\frac{\beta_1}{2}\right]\right)\tanh\left[\frac{\gamma}{2}\right] - 4\gamma^3\left(-2 + \beta_1\cot\left[\frac{\beta_1}{2}\right]\right)\tanh\left[\frac{\gamma}{2}\right]}{\beta_1^2(\beta_1^2 + \beta_2^2)\hat{\omega}^2} -$$

$$\frac{4\gamma\left(-2 + \beta_1\cot\left[\frac{\beta_1}{2}\right]\right)\tanh\left[\frac{\gamma}{2}\right]}{\beta_1^2(\beta_1^2 + \beta_2^2)} - \frac{4\beta_1^2\gamma^3\left(-2 + \beta_2\coth\left[\frac{\beta_2}{2}\right]\right)\tanh\left[\frac{\gamma}{2}\right]}{\beta_2^2(\beta_1^2 + \beta_2^2)\hat{\omega}^2} -$$

$$\left. \frac{4\gamma^4\left(-2 + \beta_2\coth\left(\left[\frac{\beta_2}{2}\right]\right)\tanh\left[\frac{\gamma}{2}\right]\right)}{\beta_2^2(\beta_1^2 + \beta_2^2)\hat{\omega}^2} - \frac{4\gamma\left(-2 + \beta_2\coth\left[\frac{\beta_2}{2}\right]\right)\tanh\left[\frac{\gamma}{2}\right]}{\beta_2^2(\beta_1^2 + \beta_2^2)} \right\},$$

and therefore a frequency characteristic equation establishes the function relation between the cable tension H* and the dimensionless frequency $\hat{\omega}$ of the stay cable, i.e., $$P = P(\hat{\omega}, H^*, EA, m, l, EI, \theta),$$

wherein the above implicit function equation is the key solving process in the structural health monitoring systems.

5. The cable tension calculation method simultaneously considering the sag, inclination angle and bending stiffness of claim 4, wherein a root of $P = P(\hat{\omega}, H^*, EA, m, l, EI, \theta)$ is solved by means of a trust region dogleg method in the calculating module in structural health monitoring systems, to identify the dimensionless frequency $\hat{\omega}$, such that the cable tension H* of the stay cable is solved.

6. The cable tension calculation method simultaneously considering the sag, inclination angle and bending stiffness of claim 4, wherein for a specific stay cable, the tensile rigidity EA, the mass per unit length m, the cable length l, the bending stiffness EI and the inclination angle θ in the frequency characteristic equation in step 4 are all constants, and therefore the cable tension H* of the stay cable is uniquely determined by the dimensionless frequency $\hat{\omega}$, wherein all these parameters are calculated and stored in the calculating module of the systems.

7. The cable tension calculation method simultaneously considering the sag, inclination angle and bending stiffness of claim 1, wherein the testing an acceleration response of the stay cable by an acceleration sensor in Step 3 specifically comprises: arranging a vibration string type acceleration response sensor near a middle span of the stay cable, to test the acceleration response of the stay cable under excitation of an environment, converting an acceleration signal into an electric signal to be transmitted, transmitting, by a network cable, the electric signal to an external working station through a data acquisition instrument, and summarizing, by the external working station, data to remotely transmit a data file back to a database for storage.

8. The cable tension calculation method simultaneously considering the sag, inclination angle and bending stiffness of claim 7, wherein the vibration string type acceleration response sensor uses a DH610J type voltage output type acceleration sensor or other suitable types.

9. The cable tension calculation method simultaneously considering the sag, inclination angle and bending stiffness of claim 1, wherein the dimensionless frequency of each order of the stay cable in Step 5 is identified by Fourier transform in the calculating module.

* * * * *